No. 847,051. PATENTED MAR. 12, 1907.
W. B. ESSICK.
HARROW.
APPLICATION FILED SEPT. 17, 1906.
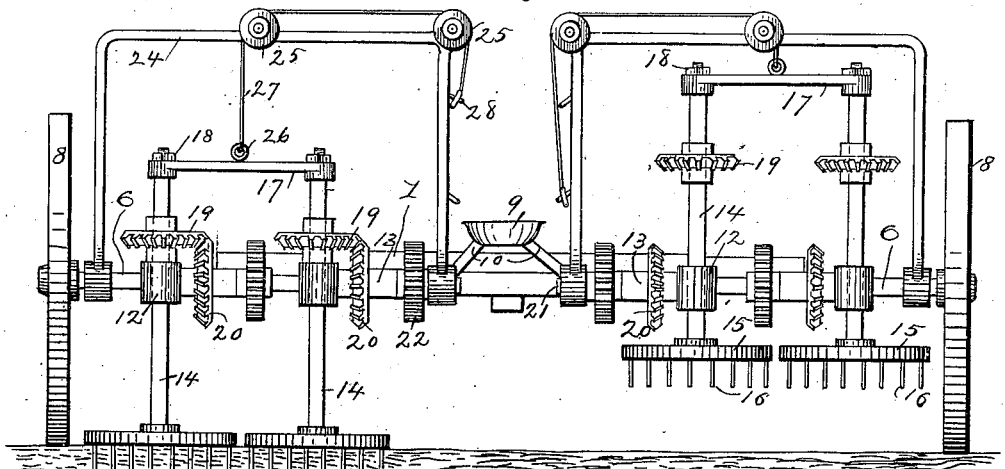
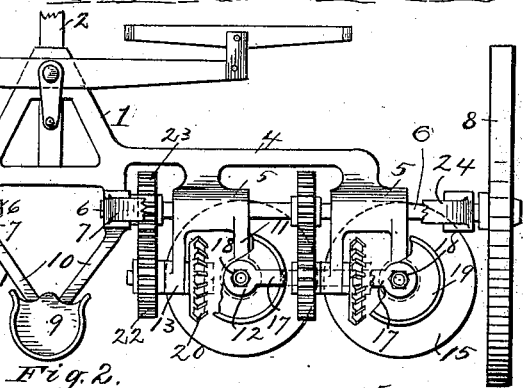
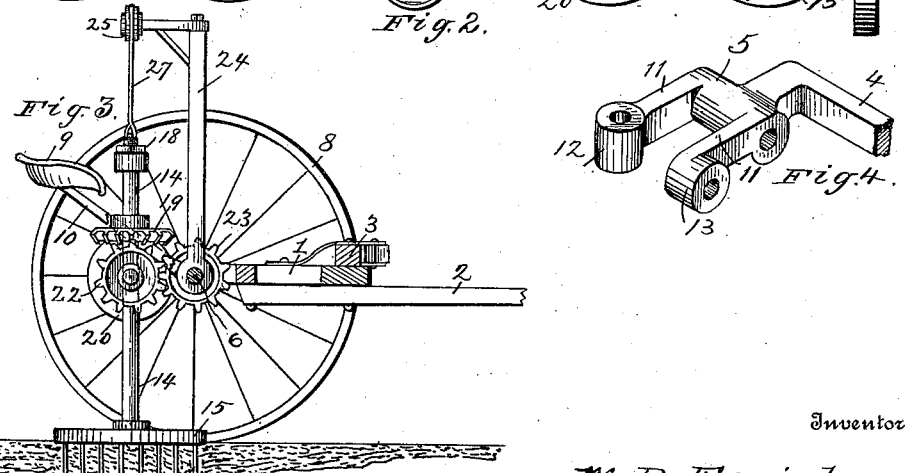
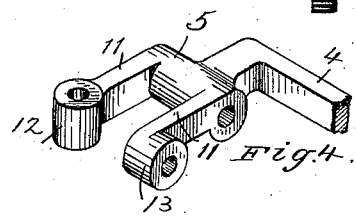
Inventor
W. B. Essick
Witnesses
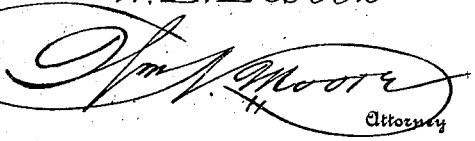

UNITED STATES PATENT OFFICE.

WILLIAM B. ESSICK, OF MANLEY, NEBRASKA.

HARROW.

No. 847,051.  Specification of Letters Patent.  Patented March 12, 1907.

Application filed September 17, 1906. Serial No. 334,868.

*To all whom it may concern:*

Be it known that I, WILLIAM B. ESSICK, a citizen of the United States, residing at Manley, in the county of Cass and State of Nebraska, have invented certain new and useful Improvements in Harrows, of which the following is a specification.

My invention relates to improvements in harrows, and has for its object to provide a rotary harrow which will cultivate the soil in a thorough manner and will be entirely practical in every respect.

With these objects in view my invention consists of suitable running-gear, disks mounted in the running-gear and driven thereby, said disks carrying teeth for engagement with the ground; and it further consists of a harrow embodying certain other novel features of construction, combination, and arrangement of parts, substantially as herein disclosed.

Figure 1 is a rear elevation of my improved harrow. Fig. 2 is a top plan view thereof. Fig. 3 is a side elevation of one-half of the machine, parts being shown in section. Fig. 4 is a detail broken view in perspective of one of the brackets for supporting the disks and gear therefor.

Referring to the drawings in detail, the numeral 1 designates the yoke or frame of the machine, in which is suitably secured the pole 2. Also secured to said yoke is the usual doubletree 3. Extending from each side of the yoke and in the same plane are the members or bars 4, which at the ends and at intermediate points are provided with rearward extensions or sleeves 5, which form bearings for the shafts or axles 6. Bearings 7 are also formed on the yoke to receive the inner ends of the axles. Wheels 8 are rigidly secured on the outer ends of the axles and are preferably formed with a broad flat tire. A seat 9 is supported on brackets 10, extending upwardly from the rear of the yoke.

Preferably formed integrally with the bearing-sleeves 5, extending rearwardly and at right angles from the axle, are the pairs of parallel arms 11. In each pair of the parallel arms one of said arms is formed with a vertical bearing 12, while the other arm is provided with a horizontal bearing 13 parallel to the axle. Each pair of parallel arms virtually forms a bracket, and for the sake of simplicity I will designate them as such. In the vertical bearings of the brackets shafts 14 are mounted, to the lower ends of which are secured the disks 15, provided with suitable downwardly-projecting teeth or spikes 16.

The upper ends of the adjacent shafts 14 are connected by bars 17, which are secured thereon by means of the adjusting-nuts 18, said bars allowing of rotation of the shafts therein. Secured upon said shafts at a point below the connecting-bar, but above the vertical bearing in the bracket, are the bevel-gears 19, said bevel-gears meshing with the bevel-gears 20, mounted on the horizontal shafts 21, supported in the horizontal bearings of the brackets. Upon the ends of the horizontal shafts opposite to the ends on which the bevel-gears are secured are fastened the reduction spur-gears 22, which are in mesh with the driving-pinions 23 on the main shafts or axles.

Frames or arches 24 extend over and above the vertical shafts, and pulleys 25 are suitably mounted on said arches. Eyes 26 are formed midway the connecting-bars, and connected to said eyes are the cords or suitable connections 27, which pass over the pulleys and have their ends secured to the pins or cleats 28.

It will be evident that my device is especially valuable as a harrow, since the rotary as well as forward motion of the disks causes the soil to be thoroughly broken. The disks may readily be thrown out of operation by hoisting the vertical shafts by means of the cords, and as the axle is made in two parts the machine may be operated on any curve.

From the above description, taken in connection with the drawings, it will be obvious that I have accomplished all the objects herein set forth and have produced a practical and efficient harrow.

I claim—

1. The combination with a frame, a divided axle mounted therein, vertical shafts mounted in pairs in the frame and driven from said axle, disks on said vertical shafts having projections on the face thereof, and means for lifting the vertical shafts in independent pairs and throwing the vertical shafts into and out of gear.

2. The combination with a frame provided with arched portions, a divided axle mounted therein, of vertical shafts supported in said frame between the arched portions thereof, counter-shafts mounted in the frame and adapted to transmit rotation from the axle to the vertical shafts, disks carried by the vertical shafts provided with projections, and suspension means carried by the arched portions for raising and lowering the vertical shafts.

3. A rotary harrow comprising a frame having arches thereon and formed with rearwardly-extending brackets, a divided axle in said frame, vertical shafts and horizontal shafts journaled in said brackets, reduction-gearing between the axle and counter-shafts, bevel-gearing between the counter-shafts and vertical shafts, toothed disks carried by the vertical shafts, bars connecting the upper ends of the vertical shafts in pairs, and elevating mechanism supported by the arches for raising the vertical shafts bodily.

In testimony whereof I have signed my name to this specification in the presence of two subscribing witnesses.

WILLIAM B. ESSICK.

Witnesses:
  O. G. COGLIZER,
  WILL LYMAN.